US 12,179,547 B2

(12) United States Patent
Berger et al.

(10) Patent No.: US 12,179,547 B2
(45) Date of Patent: Dec. 31, 2024

(54) SUSPENSION COMPONENT WITH A MEASURING DEVICE AND METHOD FOR PRODUCING A SUSPENSION COMPONENT OF THIS KIND

(71) Applicant: ZF Friedrichshafen AG, Friedrichshafen (DE)

(72) Inventors: Artur Berger, Bohmte (DE); Josef Holtheide, Neuenkirchen (DE); Julian Stratmann, Bad Essen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 267 days.

(21) Appl. No.: 17/771,224

(22) PCT Filed: Sep. 23, 2020

(86) PCT No.: PCT/EP2020/076558
§ 371 (c)(1),
(2) Date: Apr. 22, 2022

(87) PCT Pub. No.: WO2021/078459
PCT Pub. Date: Apr. 29, 2021

(65) Prior Publication Data
US 2022/0363100 A1 Nov. 17, 2022

(30) Foreign Application Priority Data
Oct. 24, 2019 (DE) .................... 10 2019 216 371.8

(51) Int. Cl.
B60G 7/02 (2006.01)
B60G 7/00 (2006.01)
(Continued)

(52) U.S. Cl.
CPC ............. *B60G 7/02* (2013.01); *B60G 7/001* (2013.01); *B60G 7/005* (2013.01); *B60G 17/019* (2013.01);
(Continued)

(58) Field of Classification Search
CPC .......... B60G 7/02; B60G 7/001; B60G 7/005; B60G 17/019; B60G 2204/1162;
(Continued)

(56) References Cited

U.S. PATENT DOCUMENTS

| 6,050,727 A | 4/2000 | Messmer et al. |
| 6,287,009 B1 | 9/2001 | Nakamura et al. |

(Continued)

FOREIGN PATENT DOCUMENTS

| CN | 103527620 A | 1/2014 |
| DE | 100 23 602 A1 | 11/2001 |

(Continued)

OTHER PUBLICATIONS

DE-102005032145-A1, English Translation (Year: 2007).*
(Continued)

*Primary Examiner* — Ryan D Walsh
(74) *Attorney, Agent, or Firm* — Finch & Maloney PLLC

(57) ABSTRACT

Disclosed is a chassis component (1, 38) having a measuring device (9) for determining a relative position of two chassis components connected movably with one another. For example, a first chassis component is a joint (2) with at least one rotation axis (8) and a second chassis component is a structural component (3), the structural component (3) being mounted by means of the joint (2) so that it can pivot around the rotation axis (8) of the joint (2). The measuring device (9) has a signal emitter (13) and a sensor device (10, 28) with a signal receiver (21), where the sensor device (10, 28) is arranged on the structural component (3) and the signal
(Continued)

emitter (13) is arranged on the joint (2). To improve an arrangement of the sensor device (10, 28) on the structural component (3), the sensor device (10, 28) extends through a through-opening (11).

19 Claims, 6 Drawing Sheets

(51) Int. Cl.
*B60G 17/019* (2006.01)
*F16C 41/00* (2006.01)
*F16F 1/38* (2006.01)
*G01P 3/44* (2006.01)

(52) U.S. Cl.
CPC ........ *F16F 1/38* (2013.01); *B60G 2204/1162* (2013.01); *B60G 2204/416* (2013.01); *B60G 2206/10* (2013.01); *B60G 2400/05162* (2013.01); *B60G 2401/17* (2013.01); *F16C 41/007* (2013.01); *F16F 2230/08* (2013.01); *G01P 3/443* (2013.01)

(58) Field of Classification Search
CPC .......... B60G 2204/416; B60G 2206/10; B60G 2400/05162; B60G 2401/17; F16F 1/38; F16F 2230/08; F16C 41/007; G01P 3/443
See application file for complete search history.

(56) References Cited

U.S. PATENT DOCUMENTS

| | | | |
|---|---|---|---|
| 6,692,179 B2 | 2/2004 | Bohne et al. | |
| 7,032,912 B2 | 4/2006 | Nicot et al. | |
| 7,695,212 B2 | 4/2010 | Spratte et al. | |
| 7,841,799 B2 | 11/2010 | Spratte et al. | |
| 8,757,648 B1 | 6/2014 | Winter | |
| 9,545,828 B2 * | 1/2017 | Grannemann | F16C 11/106 |
| 9,854,676 B2 | 12/2017 | Erskine et al. | |
| 11,279,191 B2 | 3/2022 | Holtheide et al. | |
| 11,524,539 B2 * | 12/2022 | Sieve | B60G 7/001 |
| 11,566,661 B2 * | 1/2023 | Bronswick | F16C 11/0695 |
| 2002/0114661 A1 | 8/2002 | Bohne et al. | |
| 2006/0228167 A1 | 10/2006 | Spratte et al. | |
| 2009/0016811 A1 | 1/2009 | Spratte | |
| 2010/0021336 A1 | 1/2010 | Kruse | |
| 2011/0204881 A1 | 8/2011 | Spratte et al. | |
| 2013/0001924 A1 * | 1/2013 | Adamczyk | B60D 1/065 280/511 |
| 2015/0273966 A1 | 10/2015 | Nilsson et al. | |
| 2016/0076586 A1 | 3/2016 | Campbell | |
| 2018/0230899 A1 | 8/2018 | Paulov | |
| 2019/0195278 A1 | 6/2019 | Elfert et al. | |
| 2020/0114717 A1 | 4/2020 | Stratmann et al. | |
| 2021/0309061 A1 * | 10/2021 | Sieve | F16C 11/0614 |
| 2023/0173867 A1 * | 6/2023 | Berger | B60G 17/019 280/5.5 |
| 2023/0220871 A1 * | 7/2023 | Berger | F16C 11/0685 403/135 |
| 2023/0241941 A1 * | 8/2023 | Berger | B60G 17/019 324/207.11 |

FOREIGN PATENT DOCUMENTS

| | | | | |
|---|---|---|---|---|
| DE | 101 10 738 C1 | 11/2002 | | |
| DE | 10 2004 039 781 A1 | 3/2006 | | |
| DE | 102005032145 A1 * | 1/2007 | .......... | F16C 11/0604 |
| DE | 10 2006 060 994 A1 | 6/2008 | | |
| DE | 10 2008 041 050 A1 | 2/2010 | | |
| DE | 10 2016 215 416 | 2/2018 | | |
| DE | 10 2016 215 416 A1 | 2/2018 | | |
| DE | 10 2017 208 410 | 8/2018 | | |
| DE | 10 2017 208 410 B3 | 8/2018 | | |
| DE | 10 2017 211 396 | 1/2019 | | |
| DE | 10 2017 211 396 A1 | 1/2019 | | |
| EP | 0 940 682 A1 | 9/1999 | | |
| EP | 0940682 | 9/1999 | | |
| EP | 1 424 226 | 6/2004 | | |
| EP | 1 424 226 A2 | 6/2004 | | |
| JP | S62 17 421 A | 1/1987 | | |
| JP | S6217421 | 1/1987 | | |
| WO | 2018/033322 | 2/2018 | | |
| WO | 2018/033322 A1 | 2/2018 | | |
| WO | WO-2022233530 A1 * | 11/2022 | | |

OTHER PUBLICATIONS

WO-2022233530-A1, English Translation (Year: 2022).*
German Patent Office, Office Action issued in German Application No. 10 2019 216 371.8 (Mar. 3, 2022).
European Patent Office, International Search Report, PCT Application No. PCT/EP2020/076558 (Nov. 19, 2020).
European Patent Office, Written Opinion, PCT Application No. PCT/EP2020/076558 (Nov. 19, 2020).

* cited by examiner

SUSPENSION COMPONENT WITH A MEASURING DEVICE AND METHOD FOR PRODUCING A SUSPENSION COMPONENT OF THIS KIND

RELATED APPLICATIONS

This application claims the benefit under 35 U.S.C. § 371 as a U.S. National Phase Application of application no. PCT/EP2020/076558, filed on 23 Sep. 2020, which claims benefit of German Patent Application no. 10 2019 216 371.8 filed 24 Oct. 2019, the contents of which are hereby incorporated herein by reference in their entireties.

FIELD OF THE DISCLOSURE

The invention relates to a chassis component with a measuring device for determining a relative position of two chassis components connected movably with one another, such that a first chassis component is a joint with at least one rotation axis and a further chassis component is a structural component, the structural component being mounted by means of the joint so that it can pivot around the rotation axis of the joint, and the measuring device comprises a signal emitter and a sensor device with a signal receiver, wherein the sensor device is arranged on the structural component and the signal emitter is arranged on the joint. In addition, the invention relates to a method for producing a chassis component of this type.

BACKGROUND

Such a chassis component is known from DE 10 2017 211 396 A1. In that case the structural component has on its outer surface a pocket-like or groove-like recess in which the sensor device is positioned and held.

SUMMARY

There is a need to protect the sensor receiver of the sensor device, which is designed to measure signals from the signal emitter, with sufficient protection against environmental influences. In particular the risk of damage due to environmental influences such as moisture, snow or ice, and/or mechanical damage, for example, due to flying stone chips, must be avoided. Furthermore, with certain designs of the chassis component and/or the structural component there is a danger that the signal receiver is too far away from the signal emitter. This brings the risk that no suitable position can be found on an outer surface of the structural component for locating the sensor device.

The purpose of the present invention is to develop further a chassis component and/or a method of the type mentioned at the beginning, in such manner that an arrangement of the sensor device on the structural component is improved. Preferably, the risk of environmental influences and/or mechanical damage to the signal receiver of the sensor device and/or a distance between the signal receiver of the sensor device and the signal emitter of the joint are reduced. In particular an alternative design should be provided.

The stated objective of the invention is achieved with a chassis component according to the present disclosure and/or with a method according to the present disclosure. Preferred further developments of the invention emerge from the claims and from the description that follows.

The invention relates to a chassis component. In particular, the chassis component is designed to be used in the chassis of a motor vehicle or to be arranged in a chassis of a motor vehicle. The chassis component comprises a measuring device for determining a relative position of two chassis components connected movably with one another. In particular the measuring device is in the form of an angle measuring device. A first chassis component is in the form of a joint with at least one rotation axis. A second chassis component is in the form of a structural component. In this case the structural component can indicate or define a contour or basic shape of the chassis component. In particular the structural component comprises a joint holder for positioning the joint. The structural component and the joint can pivot relative to one another. Preferably, by virtue of the joint, the structural component is able to pivot around at least one rotation axis of the joint. The measuring device comprises a signal emitter and a sensor device with a signal receiver. In this case the sensor device is arranged on the structural component and the signal emitter is arranged on the joint. Thus, by means of the measurement device a relative rotation of the structural component on the joint and about the at least one rotation axis or about more than one rotation axes of the joint can be detected. In particular, the signal receiver of the sensor device and the signal emitter co-operate with one another to determine the relative position of the two chassis components connected movably with one another. In this case the sensor device extends through a through-opening in the chassis component.

Here, it is advantageous that, owing to the arrangement of the sensor device in the through-opening, the signal receiver can be protected more effectively against environmental influences and/or mechanical damage. Furthermore, the arrangement of the sensor device in a through-opening enables the signal receiver to be arranged as small a distance away from the signal emitter as possible. In that way a more accurate or closer positioning of the signal receiver relative to the signal emitter than was possible in previous systems can be achieved. In particular, the through-opening has no adverse effect on the strength of the chassis component and/or that of the structural component; preferably, the strength of the chassis component and/or that of the structural component is maintained or even increased. This applies particularly by comparison with the forming of a groove-like recess for accommodating the sensor device, as is known from the prior art.

Specifically, a pivotable mounting of the two chassis components means a connection of the two chassis components by means of the joint, such that the two chassis components can be pivoted relative to one another about at least one rotation axis. Thus, pivotable connections can be made about just one rotation axis, just two rotation axes or just three rotation axes, or about a plurality of rotation axes. In particular, a pivotable connection does not allow any translational movement of the two chassis components relative to one another. Preferably, a pivotable mounting of the two chassis components is understood to mean a connection such that the two chassis components can be pivoted and/or tilted relative to one another about at least one rotation axis.

Preferably, in the context of the present invention a through-opening is understood to mean a cutout that passes through the chassis component, in particular the structural component and/or a joint housing of the joint. The through-opening can be enclosed all around, preferably radially all around an axial extension of the through-opening, by the chassis component, in particular the structural component and/or a joint housing of the joint.

The joint can comprise a joint housing, a bearing shell and/or an inner joint portion. In particular the inner joint portion is mounted so that it can pivot relative to the joint housing, the bearing shell and/or the structural component. Preferably the inner joint portion comprises a joint ball and/or a ball-shaped section and/or ball-section-shaped part. In particular the bearing shell is arranged between the joint housing and the inner joint portion. In that way the friction and hence the wear of the joint can be reduced by virtue of the bearing shell, which is usually made of plastic, despite sometimes large operational loads. In particular the signal emitter is arranged on the inner joint portion, preferably in the joint ball, in the ball-shaped section and/or the ball-section-shaped part. Thanks to this arrangement the signal emitter can be protected against environmental influences and/or mechanical damage. Furthermore, the signal emitter can be in the form of a permanent magnet. Without energy having to be supplied from the outside, a permanent magnet produces a magnetic field which interacts functionally with the sensor device, in particular the signal receiver of the sensor device.

In another embodiment the through-opening extends from a first aperture in the structural component to a second aperture in the structural component. In particular the said first and second openings face away from one another. Preferably, the through-opening is arranged in a part of the structural component that forms a joint holder. In particular the through-opening is arranged exclusively in the structural component itself. In this embodiment the through-opening can be completely enclosed by the structural component, all around and preferably radially all around relative to an axial extension of the through-opening. The through-opening can be produced in the chassis component by milling or drilling.

In particular, the joint is integrated in the structural component. The structural component itself, preferably part of the structural component, can at the same time form a joint housing for the joint. A bearing shell and/or an inner joint portion can be arranged in a joint recess of the structural component.

According to a further development, the through-opening has a first through-section in the structural component and a further through-section in the joint. In particular, the through-opening is formed by the said first through-section and the further through-section. Preferably, the further through-section is arranged inside the first through-section to form the through-opening. In this case the further through-section can be arranged centrally in or within the first through-section. Preferably, the further through-section is arranged in a joint housing of the joint. The further through-section in the joint housing of the joint can be in the form of a groove-like depression in an outside and/or on an outer periphery of the joint housing. The first through-section of the structural component can intersect a joint holder for receiving the joint housing. In this case the first through-section can be formed like a groove in the area of the joint holder. In particular, the first through-section and the further through-section are made with shapes corresponding to one another, in order together to form the through-opening as a whole.

According to a further embodiment, the through-opening extends transversely or perpendicularly to the rotation axis of the joint. In particular the through-opening extends transversely or perpendicularly to a longitudinal axis of the structural component. For example, in the case of a rod-like two-point control arm, the through-opening can extend parallel to the longitudinal axis of the structural component or chassis component.

In a further development, the signal receiver of the sensor device is arranged inside the through-opening. In particular, the signal receiver of the sensor device is arranged inside the further through-section of the joint. Thanks to this arrangement the signal receiver can be protected against environmental influences and/or mechanical damage. Preferably the signal receiver is positioned so as to measure signals from the signal emitter. The signal receiver can be in the form of a magnetically sensitive signal receiver, preferably a Hall sensor. A Hall sensor reacts to a change of the magnetic field with a signal. A change of a magnetic field can be caused by a relative movement between the signal emitter or magnet and the signal receiver or Hall sensor. By virtue of the sensor device and/or the arrangement of the signal receiver inside the through-opening, the signal receiver can be arranged relative to the signal emitter in a magnetically sensitive area or "within magnetic range".

According to a further embodiment the sensor device comprises a first end section and a second end section remote from the first end section. In this case the first and second end sections are arranged outside the through-opening. In particular, a section of the sensor device with the signal emitter is arranged inside the through-opening.

In a further development, the sensor device has fixing means for attaching the sensor device onto the structural component. In particular, a first end section of the sensor device and/or a second end section of the sensor device has the fixing means, preferably for fixing the sensor device onto the structural component in an interlocked manner. On its outside the sensor device can have ribs. By virtue of the said ribs the sensor device can be made to fit exactly in the through-opening and/or the sensor device can be fixed in the through-opening.

The first end section can comprise fixing means for attaching the sensor device to the structural component. For example, to form the fixing means the first section can have a through-hole. The through-hole can be designed for the insertion of fixing means such as a screw. To form the fixing means, in the area of the first end section the structural component can have a fixing holder. In particular, the fixing means cooperates with the fixing holder to fix the sensor device on the structural component and in the through-opening. For example, a screw—as the fixing means—is screwed via the through-hole into a blind-hole-like fixing holder. In particular, the first end section is arranged in the area of the first aperture of the through-opening. The second end section can be arranged in the area of the second aperture of the through-opening. Preferably, the second end section has connecting means for connecting the sensor device to an evaluation device. The evaluation device can be in the form of a plug or a plug socket.

Alternatively, or in addition, the fixing means can comprise at least one interlocking element, in particular two interlocking elements. In particular, by means of the interlocking elements any translational movement of the sensor device relative to the structural component in the axial direction of the through-opening is prevented and/or blocked. The interlocking elements can be arranged on an outside of the sensor device. In particular, the interlocking elements are in the form of preferably ramp-like elevations. The interlocking elements can be arranged on a side of the sensor device facing away from the joint. When the interlocking elements are in the form of ramp-like elevations, these can be positioned mirror-symmetrically to one another. In particular, end faces of the two ramp-like elevations face toward one another. The interlocking elements cooperate with the structural component in the area of the apertures of the through-opening to fix the sensor device. In particular, with a first end face a first interlocking element encounters an edge of the first aperture of the through-opening and with a second end face a second interlocking element encounters an edge of the second aperture of the through-opening.

Preferably, the sensor device has two sealing elements. In particular, the sealing elements are in the form of O-rings. The sealing elements can be at least partially arranged in and/or set into all-around sealing grooves in the outer periphery of the sensor device. Preferably, the sealing elements are arranged in the area of the apertures of the through-opening and inside the through-opening. A first sealing element can be arranged in the area of the first aperture of the through-opening and a second sealing element can be arranged in the area of the second aperture of the through-opening. In particular, the signal receiver is arranged between the two sealing elements.

According to a further development, between the sensor device and the through-opening an interlocking and/or rotationally fixed connection is formed. By virtue of the said interlocking and/or rotationally fixed connection any movement of the sensor device relative to the structural component, particularly a rotation movement about a longitudinal axis of the sensor device, is prevented. In particular, the sensor device has an out-of-round outer circumference and/or the through-opening has an out-of-round inner circumference. Preferably, the out-of-round outer circumference of the sensor device and the out-of-round inner circumference of the through-opening are shaped so as to correspond with one another, whereby an interlocked and at the same time rotationally fixed connection can be formed in a simple manner. The sensor device can be of rod-like and/or strut-like design. The inner circumference of the through-opening can be shaped so as to correspond with the outer circumference of the rod-like and/or strut-like sensor device. In particular, in the area of the signal receiver the outer circumference of the sensor device is completely surrounded by the material of the chassis component, specifically by the material of the structural component and/or the joint housing of the joint. In particular, in the area of the signal receiver, material of the chassis component, specifically material of the structural component and/or the joint housing, is in contact against the outer circumference of the sensor device. The chassis component, the structural component and/or the joint housing can be made of aluminum.

Preferably, owing to the interlocking connection between the sensor device and the through-opening any translational movement of the sensor device relative to the structural component in the axial direction of the through-opening is prevented and/or blocked.

The joint can be in the form of a ball and socket joint, a ball pin joint or a rubber mounting. In particular, the structural component is in the form of a control arm, a wheel carrier, a flange joint or a track-rod. For example, the structural component can be in the form of a two-point control arm, a three-point control arm or a multi-point control arm.

Of particular advantage is a method for producing a chassis component according to the invention. In this, the through-opening is made in the chassis component and the sensor device is inserted into the through-opening. In particular the through-opening is produced by milling or drilling. A first end section of the sensor device and a second end section remote from the first section of the sensor device are arranged outside the through-opening. Thus, the sensor device extends through the through-opening. In this case the central part of the sensor device located between the two end sections is positioned inside the through-opening. In particular, the signal receiver of the sensor device is arranged inside the through-opening. Thus, the signal receiver can be positioned in the central part of the sensor device. In that way, it is ensured that on the one hand the signal receiver is effectively protected against environmental influences and/or mechanical damage, and on the other hand, by virtue of the end sections extending out of the through-opening, attachment of the sensor device to the structural component and/or connection to an evaluation device is enabled.

According to a further development, the joint is first positioned in a joint holder of the structural component. For this a joint housing of the joint can be press-fitted into the joint holder. Then, the through-opening in the chassis component is made. In this case the through-opening can extend through the structural component and/or through the joint housing. Thereafter, the sensor device is arranged in the through-opening. Preferably, the sensor device is fixed to the structural component by means of a fixing device.

In an alternative embodiment a first through-section is first made in the structural component and a further through-section is made in the joint. The through-sections can be produced by milling or drilling. After that, the joint is arranged in a joint holder of the structural component. For this, a joint housing of the joint can be press-fitted into the joint holder. The said further through-section is arranged inside the first through-section to form the through-opening. Preferably, the through-opening is formed by the first through-section and the further through-section. The further through-section can be arranged in a central area of the first through-section. In particular, the first through-section and the further through-section are made with shapes that correspond with one another. In that way, the first through-section and the further through-section can cooperate with one another with interlock to form the through-opening. The central part of the first through-section and/or the further through-section can be in the form of groove-like depressions and/or groove-like channels. Thereafter, the sensor device is positioned in the through-opening.

The further through-section can have a free, in particular groove-like inside diameter, which is larger than a free, in particular groove-like inside diameter of the first through-section. In that way, when the further through-section is arranged in the first through-section a tolerance is allowed as regards the relative positioning of the first through-section and the further through-section.

In particular, the chassis component produced in accordance with the method according to the invention is a chassis component according to the invention as previously described. Preferably, the method is developed further in accordance with the design features explained in connection with the chassis component according to the invention as described herein. Moreover, the chassis component described herein can be developed further in accordance with the design features explained in connection with the method.

BRIEF DESCRIPTION OF THE DRAWINGS

Below, the invention is explained in greater detail with reference to the figures. In these, the same indexes denote the same, similar or functionally equivalent components or elements. The figures show.

DETAILED DESCRIPTION

Figure 1:
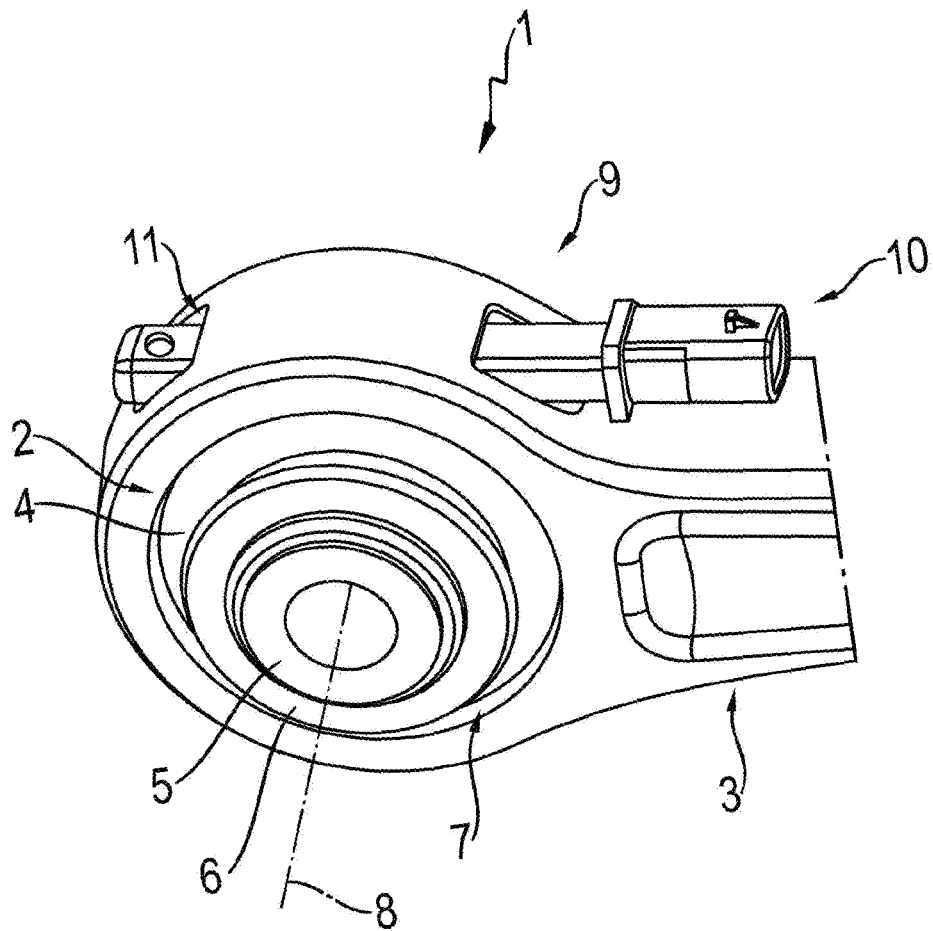
FIG. 1: Part of a perspective side view of a chassis component according to the invention.

FIG. 1 shows part of a perspective side view of a chassis component 1 according to the invention. The chassis component 1 comprises a first suspension component 2 and a further suspension component 3. In this example embodiment the first suspension component 2 is in the form of a joint 2 and the further suspension component 3 is a structural component 3. In this case the chassis component 1 consists of a control arm, namely a two-point control arm, for a chassis of a motor vehicle (not illustrated in greater detail here).

In this example embodiment the joint 2 is in the form of a ball and socket joint. The joint 2 comprises a joint housing 4 and an inner joint portion 5. Here, the inner joint portion 5 is in the form of a ball socket. Furthermore, the joint 2 has a sealing bellows 6. In this case the sealing bellows 6 has the function of protecting the joint area between the joint housing 4 and the inner joint portion 5 against external influences such as dirt, moisture, mechanical influences and the like. For that purpose, the sealing bellows 6 is made of a flexible elastic material. On the side facing away from the sealing bellows 6, which cannot be seen here, the joint 2 has s further sealing bellows 6.

The joint 2 or joint housing 4 is arranged in or press-fitted into a joint holder 7 of the structural component 3. In that way the joint housing 4 is held still relative to the structural component 3. The inner joint portion 5 can pivot in the joint housing 4 and is therefore also mounted relative to the structural component 3. The joint 2 has at least one rotation axis 8, so that the structural component 3 is mounted pivotably about the rotation axis 8 of the joint 2.

In addition, the chassis component 1 has a measuring device 9. The measuring device 9 is designed to determine a relative position of the two suspension components 2, 3 connected movably to one another. The measuring device 9 comprises a sensor device 10. The sensor device 10 extends through a through-opening 11 in the chassis component 1.

Figure 2:
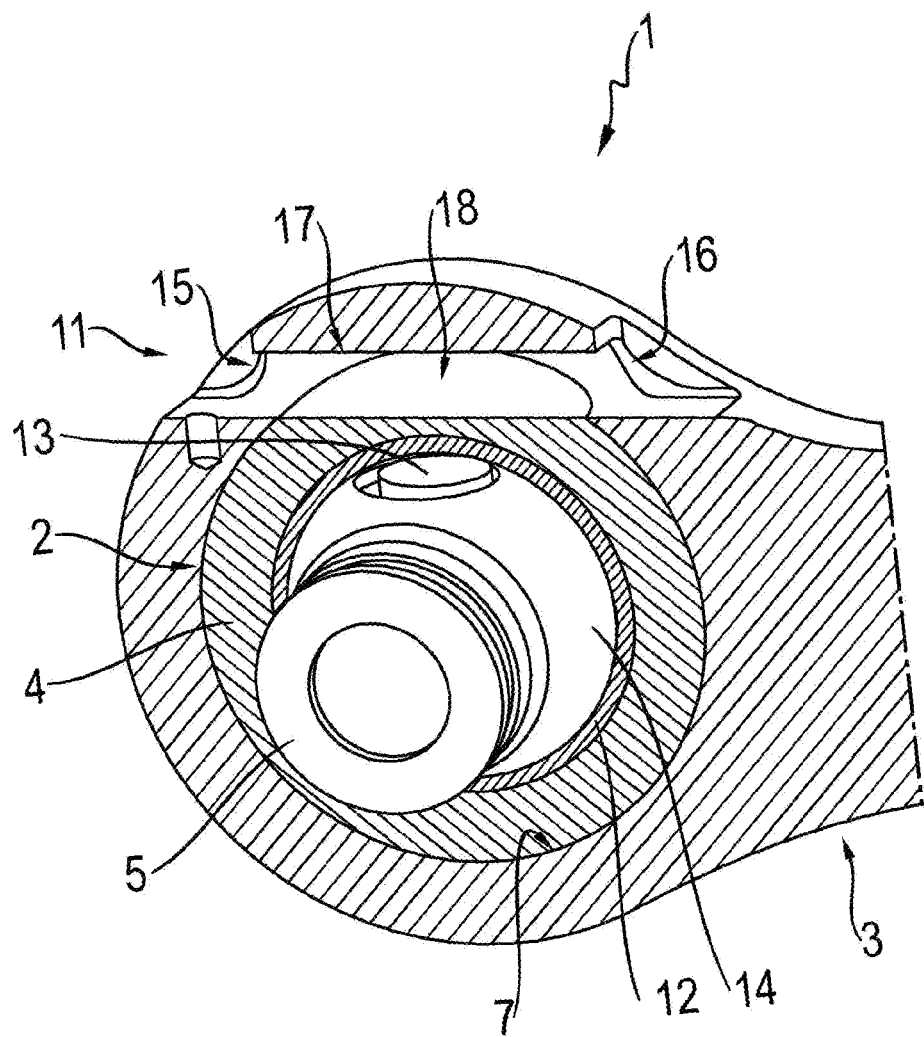
FIG. 2: Part of a partially sectioned side view of the chassis component according to the invention shown in FIG. 1, without the sensor device.

FIG. 2 shows part of a partially sectioned side view of the chassis component 1 according to FIG. 1, without the sensor device 10. The joint 2 comprises a bearing shell 12 in which the inner joint portion 5 is fitted and can pivot. The bearing shell 12 is made of a plastic. In this example embodiment the structural component 3, the joint housing 4 and the inner joint portion 5 are made of aluminum.

The measuring device 9 shown in FIG. 1 also comprises a signal emitter 13. The signal emitter 13 is arranged on or associated with the joint 2. In this example embodiment the signal emitter 13 is fixed onto the inner joint portion 5. Here, the signal emitter 13 is arranged in a joint ball 14 of the inner joint portion 5. In this example embodiment the signal emitter is in the form of a magnet.

The through-opening 11 extends from a first aperture 15 in the structural component 3 to a second aperture 16 in the structural component 3. The first aperture 15 and the second aperture 16 face away from one another.

In this example embodiment the through-opening 11 has a first through-section 17 in the structural component 3. In addition, the through-opening 11 has a further through-section 18 in the joint 2. In this case the said further through-section 18 is arranged inside the first through-section 17 to form the through-opening 11. Here, the further through-section 18 is arranged centrally in the first through-section 17. The further through-section 18 is arranged or formed in the joint housing 4 of the joint 2. In this case the said further through-section 18 is in the form of a groove-like depression or a groove-like channel in the outer periphery of the joint housing 4. A central part of the first through-section 17 is made with a shape that corresponds to the further through-section 18. Thus, the central part of the first through-section 17 is also in the form of a groove-like depression or a groove-like channel. The first through-section 17 and the further through-section 18 engage in one another with interlock and thereby form the through-opening 11.

Figure 3:
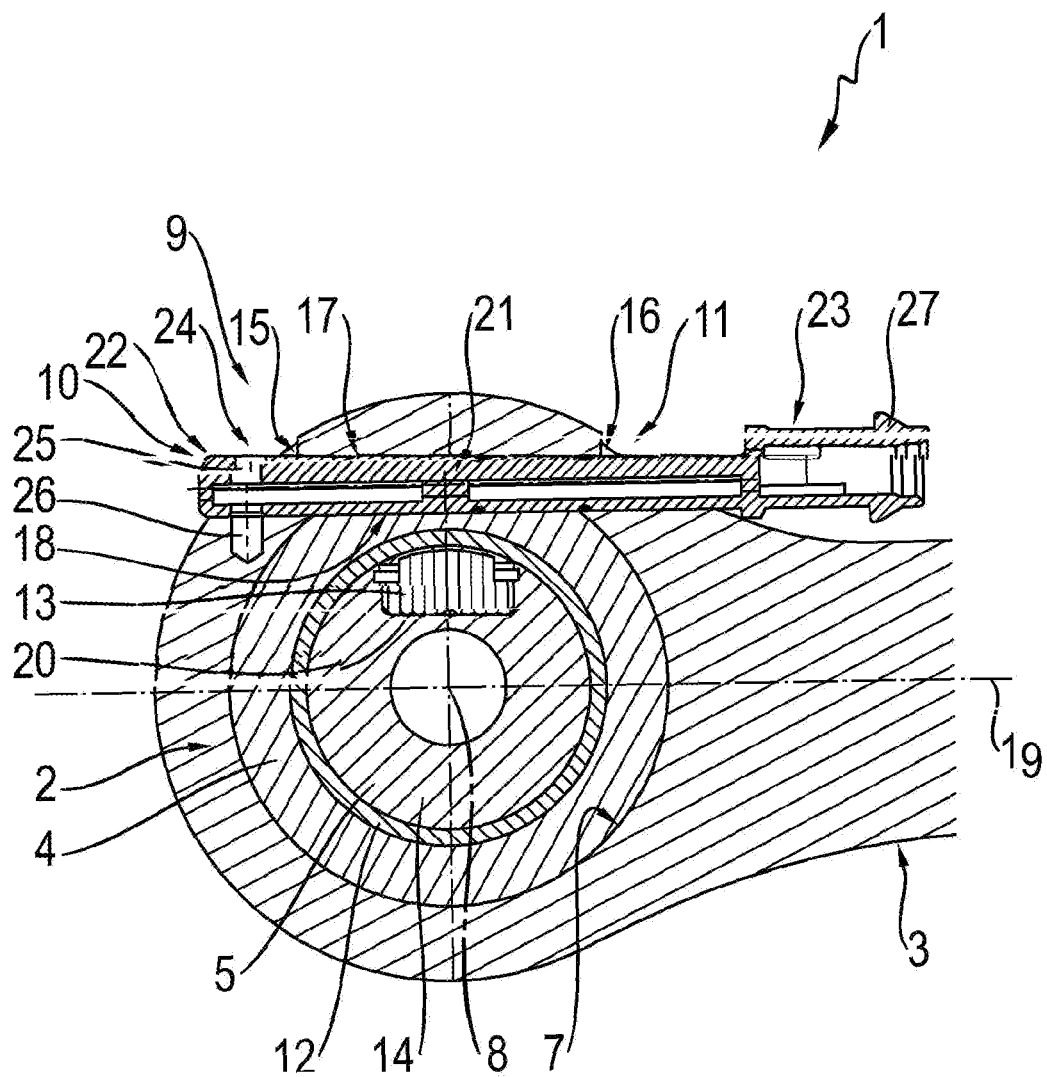
FIG. 3: Part of a sectioned side view of the chassis component according to the invention shown in FIG. 1, FIG. 4: Part of a sectioned front view of the chassis component according to the invention shown in FIG. 1, FIG. 5: A perspective side view of a further sensor device for forming a chassis component according to the invention.

FIG. 3 shows part of a sectioned side view of the chassis component 1 according to the invention as it is shown in FIG. 1. In this example embodiment the through-opening 1 extends perpendicularly to the rotation axis 8 of the joint 2. Moreover, in this example embodiment the through-opening 11 extends parallel to a longitudinal axis 19 of the structural connect 3. The signal emitter 13 is arranged in a recess 20 of the joint ball 14.

The sensor device 10 comprises a signal receiver 21. In this example embodiment the signal receiver is in the form of a Hall sensor element. The signal receiver 21 is arranged inside the through-opening 11. Furthermore, in this example embodiment the signal receiver 21 is arranged inside the further through-section 18 of the joint 2 or joint housing 4. Thus, in the area of the signal receiver 21 the sensor device 10 is surrounded by the material of the joint 2 or joint housing 4 and the structural component 3, so that the signal receiver is protected against external environmental influences and/or mechanical loads.

In this example embodiment the sensor device 10 is rod-shaped or strut-shaped. Moreover, the sensor device 10 has a first end section 22 and a second end section 23 facing away from the first end section 22. The two end sections 22, 23 are arranged outside the through-opening 11. In this example embodiment the first end section 22 is designed such that the said first end section 22 can be inserted through the through-opening 11 to position the sensor device 10 in the through-opening 11.

Furthermore, in this example embodiment the first end section 22 has fixing means 24 for fixing the sensor device 10 onto the structural component 3. In this example embodiment the fixing means 24 has a through-hole 25 in the first end section 22. Through the said through-hole a fixing element (not shown here) such as a screw can be fitted into a fixing recess 26. In this case the fixing recess 26 is part of the fixing means 24 and is formed in the structural component 3. In this example embodiment the fixing recess 26 is in the form of a blind hole into which a screw can be screwed.

In this example embodiment the second end section 23 comprises connection means 27. The connection means 27 is designed for the connection of the sensor device 10 to an evaluation device (not shown here). In this case the connection means 27 is for example in the form of a plug socket.

Figure 4:
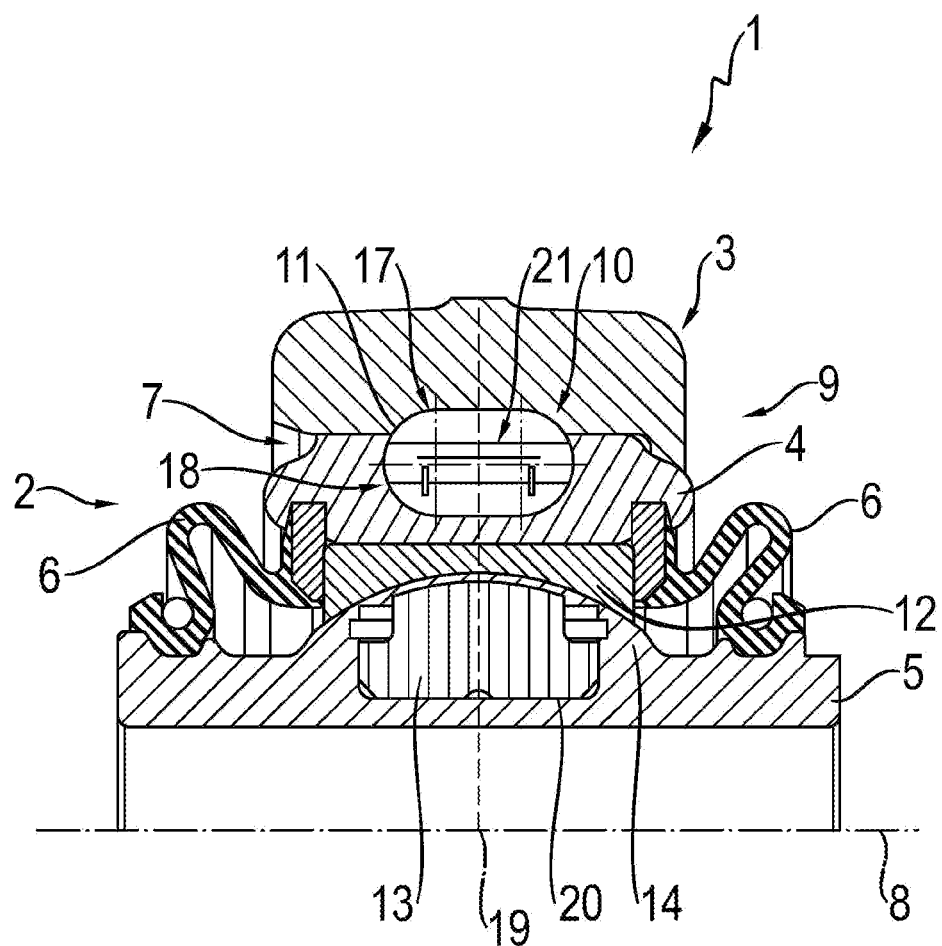

FIG. 4 shows part of a sectioned front view of the chassis component 1 according to the invention as shown in FIG. 1. To prevent any twisting of the sensor device 10 about its longitudinal axis, an interlocking or rotationally fixed connection is formed between the sensor device 10 and the through-opening 11. For that purpose, the sensor device 10 has an out-of-round outer circumference and the through-opening 11 has a correspondingly shaped out-of-round inner circumference. Accordingly, the sensor device 10 and the through-opening 11 cooperate to produce an interlock with one another. In this example embodiment the sensor device 10 and the through-opening 11 have elongated-hole-like cross-sections.

To design or produce the chassis component 1 according to FIGS. 1 to 4, the through-opening 11 is produced in the chassis component 1 and the sensor device 10 is inserted into the through-opening 11. In this case the first end section 22 and the second end section 23 of the sensor device 10 are arranged outside the through-opening 11.

According to a first version the joint 2 is first arranged in or press-fitted into the joint holder 7 of the structural component 3. Then, the through-opening 11 is made. This can be done for example by milling or drilling. Thereafter, the sensor device 10 is fitted into the through-opening 11.

In an alternative embodiment, the first through-section 17 is first produced in the structural component 2. Independently of this, the further through-section 18 is produced in the joint 2 or joint housing 4. The first through-section and the further through-section can again be made by milling or drilling. Only when this has been done or thereafter, the joint 2 is positioned in the joint holder 7 of the structural component 3. In this, the further through-section 18 of the joint 2 is arranged inside the first through-section 17 to form the through-opening 11. In this example embodiment the further through-section 18 is positioned in a central part of the first through-section 17. Thereafter, the sensor device 10 is fitted into the through-opening 11.

Figure 5:
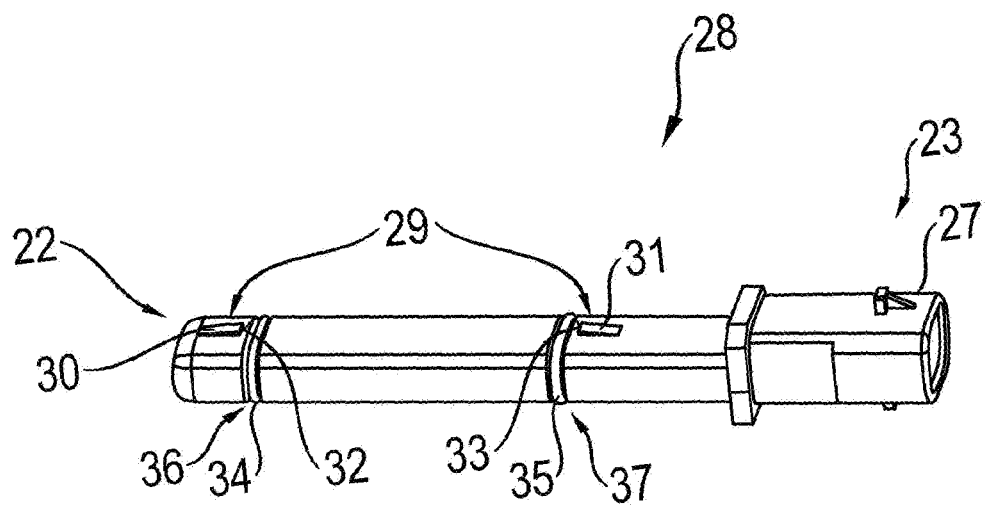

FIG. 5 shows a perspective side view of a further sensor device 28 for producing a chassis component according to the invention. The structure of the said further sensor device 28 corresponds largely to the sensor device 10 according to the previous figures. Accordingly, reference can be made to the earlier description.

Otherwise than in the sensor device 10, the further sensor device 28 comprises no features for forming the fixing means 24. Instead the further sensor device 28 has further fixing means 29.

In this example embodiment the fixing means 29 has two interlock elements 30, 31. The interlock elements 30, 31 are arranged on an outer side of the sensor device 28. Here, the interlock elements 30, 31 are in the form of ramp-like elevations. The interlock elements 30, 31 in the form of ramp-like elevations and arranged mirror-symmetrically relative to one another. In this case end faces 32, 33 of the two ramp-like elevations or interlock elements 30, 31 face toward one another.

The sensor device 28 also comprises two sealing elements 34, 35. In this example embodiment the sealing elements 34, 35 are in the form of O-rings. The sealing elements 34, 35 are at least partially arranged in or set into all-around sealing grooves 36, 37 around the outer circumference of the sensor device 28.

Figure 6:
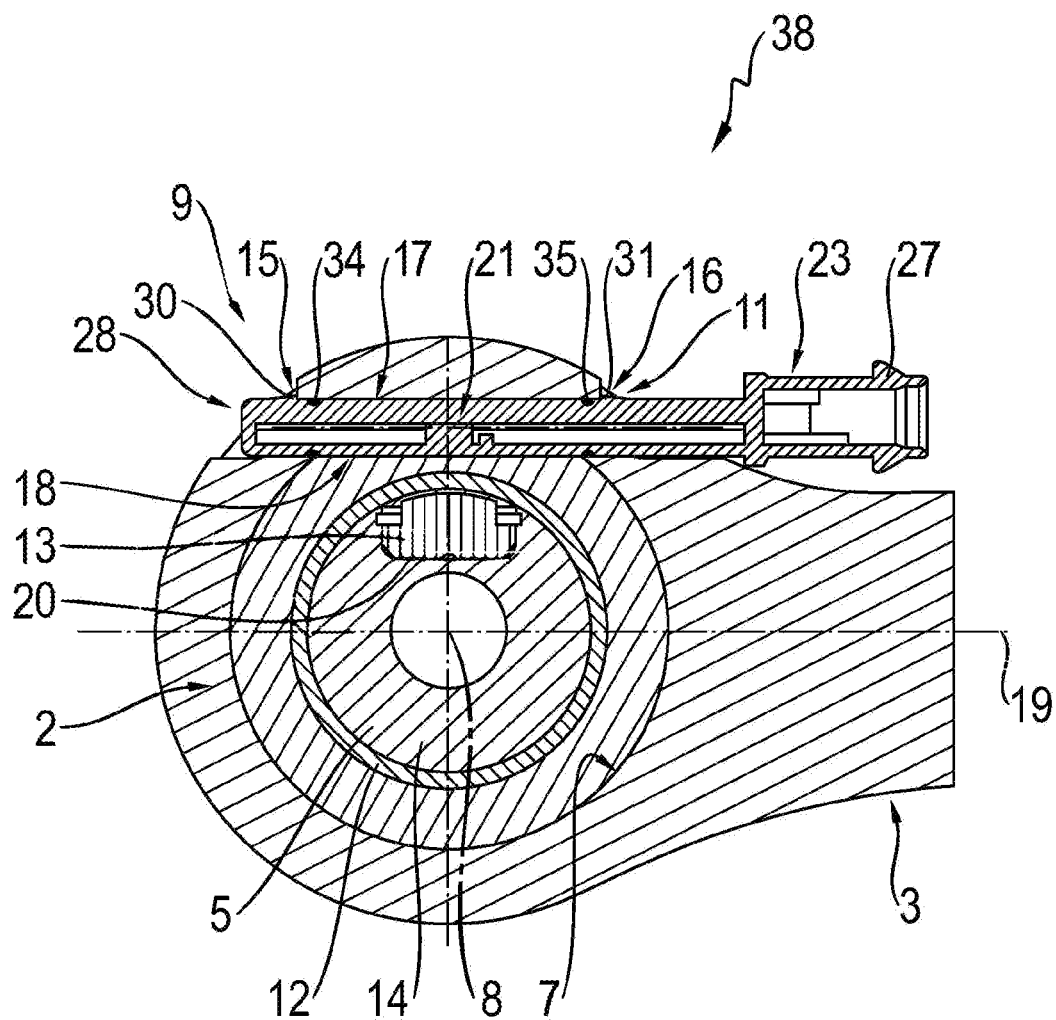
FIG. 6: A further part of a sectioned side view of a chassis component according to the invention with a further sensor device as shown in FIG. 5.

FIG. 6 shows a further part of a sectioned side view of a chassis component 38 according to the invention with the further sensor device 28 according to FIG. 5. The structure of the chassis component 38 corresponds largely to the chassis component 1 according to the preceding FIGS. 1 to 4. Accordingly, reference should also be made to the earlier description.

By virtue of the interlock elements 30, 31 any translational movement of the sensor device 28 relative to the structural component 3 in the axial direction of the through-opening 11 is prevented or blocked. The interlock elements 30, 31 are arranged on a side of the sensor device 28 facing away from the joint 2. In this case, in the area of the apertures 15, 16 of the through-opening 11 the interlock elements 30, 31 cooperate with the structural component 3 to fix the sensor device 28. In particular, with its first end face the first interlock element 30 encounters an edge of the first aperture 15 of the through-opening 11 and with its second end face the second interlock element 31 encounters an edge of the second aperture 16 of the through-opening 11.

The sealing elements 34, 35 are arranged in the area of the apertures 15, 16 of the through-opening 11 and inside the through-opening 11. The first sealing element 34 is arranged in the area of the first aperture 15 of the through-opening 11 and the second sealing element 35 is arranged in the area of the second aperture 16 of the through-opening 11. Thus, the signal receiver 21 is positioned between the two sealing elements 34, 35 and is accordingly particularly well protected against environmental influences from the outside.

INDEXES

1 Chassis component
2 First suspension component/joint
3 Further suspension component/structural component
4 Joint housing
5 Inner joint portion
6 Sealing bellows
7 Joint holder
8 Rotation axis
9 Measuring device
10 Sensor device
11 Through-opening
12 Bearing shell
13 Signal emitter
14 Joint ball
15 First aperture
16 Second aperture
17 First through-section
18 Further through-section
19 Longitudinal axis
20 Recess
21 Signal receiver
22 First end section
23 Second end section
24 Fixing means
25 Through-hole
26 Fixing recess
27 Connecting means
28 Sensor device
29 Fixing means
30 Interlock element
31 Interlocks element
32 End face
33 End face
34 Sealing element
35 Sealing element
36 Sealing groove
37 Sealing groove
38 Chassis component

The invention claimed is:
1. A chassis component with a measuring device for determining a relative position of two chassis components movably connected to one another,
wherein a first chassis component is a joint with at least one rotation axis, and a second chassis component is a structural component, and the structural component is mounted by the joint to pivot about the rotation axis of the joint, the measuring device comprising a signal emitter and a sensor device with a signal receiver, the sensor device is arranged on the structural component and the signal emitter is arranged on the joint, and the sensor device extends through a through-opening defined through the structural component and the sensor device has a first end section and a second end section, and the signal receiver senses the signal from the signal emitter through a side section of the sensor device, which is located between the first and second end sections.

2. The chassis component according to claim 1, wherein the through-opening has a first through-section formed in the structural component and a second through-section formed in the joint, and the second through-section is arranged inside the first through-section and together form the through-opening.

3. The chassis component according to claim 2, wherein the signal receiver of the sensor device is arranged inside the second through-section of the joint.

4. The chassis component according to claim 2, wherein the second through-section is formed in a joint housing of the joint.

5. The chassis component according to claim 1, wherein the through-opening extends transversely or perpendicularly to the rotation axis of the joint.

6. The chassis component according to claim 5, wherein the through-opening extends parallel to a longitudinal axis of the structural component.

7. The chassis component according to claim 1, wherein the first end section and the second end section are arranged outside the through-opening, and the second end section has a connection for connection to an evaluation device.

8. The chassis component according to claim 7, wherein the sensor device comprises fixing means for fixing the sensor device onto the structural component.

9. The chassis component according to claim 8, wherein at least one of the first end section of the sensor device and the second end section of the sensor device has the fixing means, and the fixing means is configured to fasten the sensor device onto the structural component in an interlocked manner.

10. The chassis component according to claim 1, wherein at least one of an interlocking and rotationally fixed connection is formed between the sensor device and the through-opening.

11. The chassis component of claim 10, wherein the sensor device is of a rod-like or a strut-like shape.

12. The chassis component of claim 11, wherein the sensor device has an out-of-round outer circumference and the through-opening has an out-of-round inner circumference.

13. The chassis component according to claim 1, wherein the joint is in the form of one of a ball and socket joint, a ball pin joint, or a rubber mounting.

14. The chassis component according to claim 13, wherein the structural component is in the form of one of a control arm, a wheel carrier, a flange joint, or a track-rod.

15. A chassis component with a measuring device for determining a relative position of first and second chassis components movably connected to one another, wherein the first chassis component is a joint with at least one rotation axis, and the second chassis component is a structural component, and the structural component is mounted by the joint to pivot about the rotation axis of the joint, the measuring device comprises a signal emitter and a sensor device with an associated signal receiver, wherein the sensor device is arranged on the structural component and the signal emitter is arranged on the joint, and the sensor device has a first end section and a second end section, the sensor device extends completely through a through-opening, which has opposed first and second apertures defined in the structural component, so that the signal receiver is positioned inside the through-opening and spaced from both the first aperture in the structural component and the second aperture in the structural component as well as spaced from both the first end section and the second end section of the sensor device, and the signal receiver senses the signal from the signal emitter through a side section of the sensor device located between the first and the second end sections.

16. The chassis component according to claim 15, wherein the first aperture and the second aperture face away from one another.

17. A method for producing a chassis component having a measuring device for determining a relative position of two chassis components connected movably to one another, wherein a first chassis component is a joint with at least one rotation axis and a second chassis component is a structural component, the structural component being mounted by the joint to pivot about the rotation axis of the joint, the measuring device comprising a signal emitter and a sensor device with a signal receiver, the sensor device is arranged on the structural component and the signal emitter is arranged on the joint, and the sensor device extends through a through-opening defined in the joint and/or in the structural component, the method comprising:

forming a through-opening in the chassis component to have a first aperture and an opposed second aperture; and inserting the sensor device into the through-opening, in such a manner that a first end section of the sensor device faces away from a second end section of the sensor device and the signal receiver is positioned inside the through-opening spaced from both the first aperture and the second aperture so as to measure a signal through a side section of the sensor device which is located between the first and second end sections; and arranging the first end section and the second end section outside the through-opening.

18. The method according to claim 17, comprising:

arranging the joint in a joint holder of the structural component;

forming the through-opening; and arranging the sensor device in the through-opening.

19. The method according to claim 17, comprising:

forming a first through-section in the structural component;

forming a second through-section in the joint;

arranging the joint in a joint holder of the structural component;

arranging the second through-section inside the first through-section in order to form the through-opening; and arranging the sensor device in the through-opening so that the sensor device is supported by both the first through-section in the structural component and the second through-section in the joint.

* * * * *